US010224636B2

(12) United States Patent
Matitsine et al.

(10) Patent No.: US 10,224,636 B2
(45) Date of Patent: Mar. 5, 2019

(54) SPHERICAL LENS ARRAY BASED MULTI-BEAM ANTENNAE

(71) Applicant: Matsing, Inc., Irvine, CA (US)

(72) Inventors: Serguei Matitsine, Irvine, CA (US); Leonid Matytsine, Irvine, CA (US); Anthony DeMarco, Leadville, CO (US)

(73) Assignee: Matsing Inc., Irvine, CA (US)

( * ) Notice: Subject to any disclaimer, the term of this patent is extended or adjusted under 35 U.S.C. 154(b) by 0 days.

(21) Appl. No.: 15/698,850

(22) Filed: Sep. 8, 2017

(65) Prior Publication Data

US 2017/0373400 A1 Dec. 28, 2017

Related U.S. Application Data

(63) Continuation of application No. 15/289,531, filed on Oct. 10, 2016, which is a continuation of application
(Continued)

(51) Int. Cl.
*H01Q 19/06* (2006.01)
*H01Q 15/02* (2006.01)
(Continued)

(52) U.S. Cl.
CPC ............. *H01Q 15/02* (2013.01); *H01Q 1/24* (2013.01); *H01Q 1/36* (2013.01); *H01Q 3/14* (2013.01);
(Continued)

(58) Field of Classification Search
CPC ............ H01Q 1/36; H01Q 1/24; H01Q 15/24; H01Q 15/02; H01Q 21/22; H01Q 5/20;
(Continued)

(56) References Cited

U.S. PATENT DOCUMENTS 5,821,908 A 10/1998 Sreenivas
6,208,288 B1 3/2001 Shoucri et al.
(Continued)

FOREIGN PATENT DOCUMENTS

CN 10217545 A 9/2011
KR 10-2009-0040887 4/2009
WO 2008015757 A1 2/2008

*Primary Examiner* — Hai Tran
(74) *Attorney, Agent, or Firm* — Fish IP Law, LLP (57) ABSTRACT

A radio frequency antenna uses an array of spherical lens and mechanically movable radio frequency (RF) elements along the surface of the spherical lens to provide cellular coverage for a narrow geographical area. The antenna includes at least two spherical lenses, where each spherical lens has an associated element assembly. Each element assembly has a track that curves along the contour of the exterior surface of the spherical lens and along which a radio frequency (RF) element can move. The antenna also includes a phase shifter configured to adjust a phase of the signals produced by the RF elements. The antenna includes a control mechanism configured to enable a user to move the RF elements along their respective tracks, and automatically configure the phase shifter to modify a phase of the output signals from the elements based on the relative positions between the RF elements.

18 Claims, 8 Drawing Sheets

Related U.S. Application Data

No. 14/958,607, filed on Dec. 3, 2015, now Pat. No. 9,728,860.

(60) Provisional application No. 62/201,523, filed on Aug. 5, 2015.

(51) Int. Cl.

| | | |
|---|---|---|
| *H01Q 1/36* | (2006.01) | |
| *H01Q 5/20* | (2015.01) | |
| *H01Q 21/22* | (2006.01) | |
| *H01Q 1/24* | (2006.01) | |
| *H01Q 3/14* | (2006.01) | |
| *H01Q 3/38* | (2006.01) | |
| *H01Q 3/18* | (2006.01) | |
| *H01Q 3/36* | (2006.01) | |
| *H01Q 21/00* | (2006.01) | |
| *H01Q 15/18* | (2006.01) | |
| *H04B 7/155* | (2006.01) | |

(52) U.S. Cl.
CPC ............. *H01Q 3/18* (2013.01); *H01Q 3/36* (2013.01); *H01Q 3/38* (2013.01); *H01Q 5/20* (2015.01); *H01Q 19/062* (2013.01); *H01Q 21/0031* (2013.01); *H01Q 21/22* (2013.01); *H01Q 15/18* (2013.01); *H01Q 19/06* (2013.01); *H04B 7/155* (2013.01)

(58) Field of Classification Search
CPC ...... H01Q 15/18; H01Q 19/062; H01Q 19/06; H04B 7/155
USPC .................. 343/755, 911 L, 911 R, 754
See application file for complete search history.

(56) References Cited

U.S. PATENT DOCUMENTS

| | | | |
|---|---|---|---|
| 6,292,134 B1* | 9/2001 | Bondyopadhyay | H01Q 3/242 342/374 |
| 7,151,508 B2 | 12/2006 | Schaffner et al. | |
| 7,605,768 B2 | 10/2009 | Ebling et al. | |
| 2006/0017637 A1 | 1/2006 | Howell et al. | |
| 2014/0227966 A1 | 8/2014 | Artemenko et al. | |
| 2015/0070230 A1 | 3/2015 | Bradley et al. | |
| 2015/0091767 A1* | 4/2015 | Matitsine | H01Q 19/06 343/755 |

* cited by examiner

SPHERICAL LENS ARRAY BASED MULTI-BEAM ANTENNAE

This application is a continuation of co-pending U.S. Non-Provisional application Ser. No. 15/289,531, filed Oct. 10, 2016, which is a continuation of U.S. Non-Provisional application Ser. No. 14/958,607, filed Dec. 3, 2015, which claims the benefit of U.S. Provisional Application No. 62/201,523 filed Aug. 5, 2015. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF INVENTION

The field of the invention is radio frequency antenna technology.

BACKGROUND

The following description includes information that may be useful in understanding the present invention. It is not an admission that any of the information provided herein is prior art or relevant to the presently claimed invention, or that any publication specifically or implicitly referenced is prior art.

As the demand for transmission of high quality content across the cellular network increases, the need for better large-scale cellular antennae that support higher capacity rises. The commonly used sector antenna designs have several drawbacks. First, there is a limited number of ports allowed per sector. Second, sector antenna has marginal pattern and beam performance (e.g., poor isolation between beams in the case of multi-beam antennas, side lobes, etc.).

It has been proposed that using a spherical lens (e.g., a Luneburg lens, etc.) along with radio frequency transceivers can provide better result than traditional sector antenna. For example, U.S. Pat. No. 5,821,908 titled "Spherical Lens Antenna Having an Electronically Steerable Beam" issued to Sreenivas teaches an antenna system capable of producing independently steerable beams using a phased array antenna and a spherical lens. U.S. Pat. No. 7,605,768 titled "Multi-Beam Antenna" issued to Ebling et al. discloses a multi-beam antenna system using a spherical lens and an array of electromagnetic lens elements disposed around the surface of the lens.

However, these antenna systems are not suitable for base station antennae. Thus, there is still a need for effectively utilizing spherical lens in a base station antenna application.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

In one aspect of the inventive subject matter, an antenna uses an array of spherical lens and mechanically movable elements along the surface of the spherical lens to provide cellular coverage for a narrow geographical area. In some embodiments, the antenna includes at least two spherical lens aligned along a virtual axis. The antenna also includes an element assembly for each spherical lens. Each element assembly has at least one track that curves along the contour of the exterior surface of the spherical lens and along which a radio frequency (RF) element can move. In some embodiment, the track allows the RF element to move in a direction that is parallel to the virtual axis. The antenna also includes a phase shifter that is configured to adjust a phase of the signals produced by the RF elements. The antenna includes a control mechanism that is connected to the phase shifter and the RF elements. The control mechanism is configured to enable a user to move the RF elements along their respective tracks, and automatically configure the phase shifter to modify a phase of the output signals from the elements based on the relative positions between the RF elements.

In some embodiments, the tracks also enable the RF elements to move in a direction that is perpendicular to the virtual axis.

Multiple RF elements can be placed on a single track. In these embodiments, the multiple RF elements on the same track can be moved independently of each other. In addition, the control mechanism is also programmed to coordinate multiple pairs (or groups) of RF elements and to configure a phase shifter to modify a phase of the output signals transmitted from the same pair (or group) of RF elements, so that the signals would be in-phase.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In one aspect of the inventive subject matter, an antenna uses an array of spherical lens and mechanically movable elements along the surface of the spherical lens to provide cellular coverage for a small, focused geographical area. In some embodiments, the antenna includes at least two spherical lens aligned along a virtual axis. The antenna also includes an element assembly for each spherical lens. Each element assembly has at least one track that curves along the contour of the exterior surface of the spherical lens and along which a radio frequency (RF) element can move. In some embodiment, the track allows the RF element to move in a direction that is parallel to the virtual axis. The antenna also includes a phase shifter that is configured to adjust a phase of the signals produced by the RF elements. The antenna includes a control mechanism that is connected to the phase shifter and the RF elements. The control mechanism is configured to enable a user to move the RF elements along their respective tracks, and automatically configure the phase shifter to modify a phase of the output signals from the elements based on the relative positions between the RF elements.

Figure 1A:
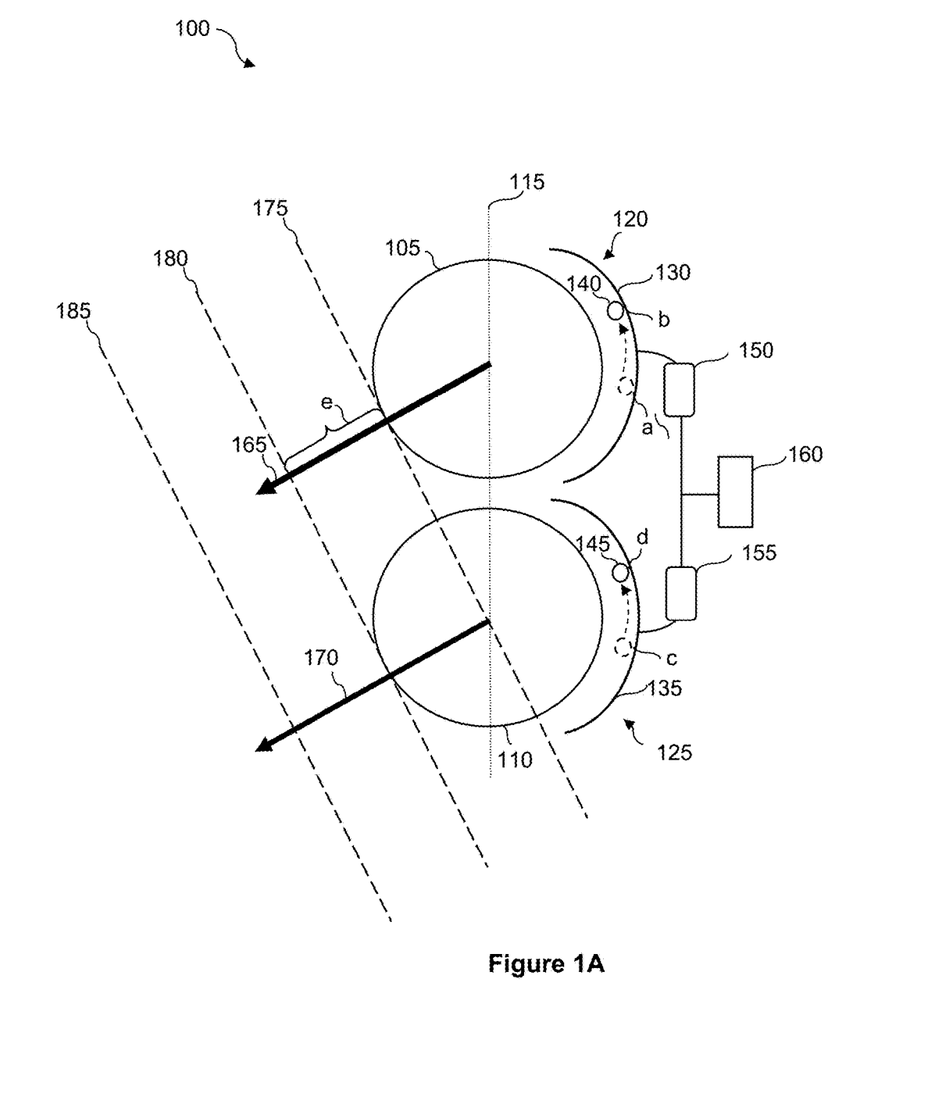
FIG. 1A illustrates an exemplary antenna system of some embodiments.

FIG. 1A illustrates an antenna system 100 according to some embodiments of the inventive subject matter. In this example, the antenna system 100 includes two spherical lenses 105 and 110 that are aligned along a virtual axis 115 in a three-dimensional space. It is noted that although only two spherical lenses are shown in this example, more spherical lens can be aligned along the virtual axis 115 in the antenna system 100. A spherical lens is a lens with a surface having a shape of (or substantially having a shape of) a sphere. As defined herein, a lens with a surface that substantially conform to the shape of a sphere means at least 50% (preferably at least 80%, and even more preferably at least 90%) of the surface area conforms to the shape of a sphere. Examples of spherical lenses include a sphericalshell lens, the Luneburg lens, etc. The spherical lens can include only one layer of dielectric material, or multiple layers of dielectric material. A conventional Luneburg lens is a spherically symmetric lens that has multiple layers inside the sphere with varying indices of refraction.

The antenna system 100 also includes an element assembly 120 associated with the spherical lens 105, and an element assembly 125 associated with the spherical lens 110. Each element assembly includes at least one track. In this example, the element assembly 120 includes a track 130 while the element assembly 125 includes a track 135. As shown, each of the tracks 130 and 135 has a shape that substantially conforms to (curves along) the exterior surface of its associated spherical lens. The tracks 130 and 135 can vary in length and in dimensions. In this example, the tracks 130 and 135 are one-dimensional and oriented along the virtual axis 115. In addition, each of the tracks 130 and 135 covers less than half of a circle created by the respective spherical lens. However, it is contemplated that the tracks 130 and 135 can have different orientation (e.g., oriented in perpendicular to the virtual axis 115, etc.), can be two-dimensional (or multi-dimensional), and/or can cover smaller or larger portions of the surface areas of the spherical lenses 105 and 110 (e.g., covering a circumference of a circle created by the spherical lenses 105 and 110, covering a hemispherical area of the spherical lenses 105 and 110, etc.).

Each of the element assemblies 120 and 125 also houses at least one RF element. An RF element can include an emitter, a receiver, or a transceiver. As shown, the element assembly 120 houses an RF element 140 on the track 130, and the element assembly 125 houses an RF element 145 on the track 135. In this example, each of the element assemblies 120 and 125 only includes one RF element, but it has been contemplated that each element assembly can house multiple RF elements on one or more tracks.

In some embodiments, each RF element (from RF elements 140 and 145) is configured to transmit an output signal (e.g., a radio frequency signal) in the form of a beam to the atmosphere through its corresponding spherical lens. The spherical lens allows the output RF signal to narrow so that the resultant beam can travel a farther distance. In addition, the RF elements 140 and 145 are configured to receive/detect incoming signals that have been focused by the spherical spheres 105 and 110.

Each RF element (of the RF elements 140 and 145) is physically connected to (or alternatively, communicatively coupled with) a phase shifter for modifying a phase of the output RF signal. In this example, the RF element 140 is communicatively coupled to a phase shifter 150 and the RF element 145 is communicatively coupled to a phase shifter 155. The phase shifters 150 and 155 are in turn physically connected to (or alternatively, communicatively coupled with) a control mechanism 160.

In some embodiments, the control mechanism 160 includes a mechanical module configured to enable a user to mechanically move the RF elements 140 and 145 along the tracks 130 and 135, respectively. The interface that allows the user to move the RF elements can be a mechanical rod or other physical trigger. It is noted that the mechanical rod can have a shape such as a cylinder, a flat piece of dielectric material, or any kind of elongated shapes. In some embodiments, the control mechanism 160 also includes an electronic device having at least one processor and memory that stores software instructions, that when executed by the processor, perform the functions and features of the control mechanism 160. The electronic device of some embodiments is programmed to control the movement of the RF elements 140 and 145 along the tracks 130 and 135, respectively. The electronic device can also provides a user interface (e.g., a graphical user interface displayed on a display device, etc.) that enables the user to control the movement of the RF elements 140 and 145. The electronic device can in turn be connected to a motor that controls the mechanical module. Thus, the motor triggers the mechanical module upon receiving a signal from the electronic device.

For example, the control mechanism 160 can move the RF element 140 from position 'a' (indicated by dotted-line circle) to position 'b' (indicated by solid-line circle) along the track 130, and move the RF element 145 from position 'c' (indicated by dotted-line circle) to position 'd' (indicated by solid-line circle) along the track 135. By moving the RF elements to different positions, the antenna system 100 can dynamically change the geographical coverage area of the antenna 100. It is also contemplated that by moving multiple RF elements and arranging them in different positions, the antenna system 100 can also dynamically change the coverage size, and capacity allocated to different geographical areas. As such, the antenna system 100, via the control mechanism 160, can be programmed to configure the RF elements to provide coverage at different geographical areas and different capacity (by having more or less RF elements covering the same geographical area) depending on demands at the time.

For example, as the control mechanism 160 moves the RF elements 140 and 145 from positions 'a' and 'c' to positions 'b' and 'd,' respectively, the antenna system 100 can change the geographical coverage area to an area that is closer to the antenna system 100. It is also noted that having multiple spherical lenses with associated RF element allow the antenna system 100 to (1) provide multiple coverage areas and/or (2) increase the capacity within a coverage area. In this example, since both of the RF elements 140 and 145 associated with the spherical lenses 105 and 110 are directing resultant output signal beams at the same direction as indicated by arrows 165 and 170, the antenna system 100 effectively has double the capacity for the coverage area when compared with an antenna system having only one spherical lens with one associated RF element.

However, it is noted that in an antenna system where multiple spherical lenses are aligned with each other along a virtual axis (e.g., the virtual axis 115), when multiple RF elements are transmitting output RF signals through the multiple spherical lenses at an angle that is not perpendicular to the virtual axis along which the spherical lenses are aligned, the signals from the different RF elements will be out of phase. In this example, it is shown from the dotted lines 175-185 that the output signals transmitted by the RF elements 140 and 145 at positions 'b' and 'd,' respectively, are out of phase. Dotted lines 175-185 are virtual lines that are perpendicular to the direction of the resultant output signal beams transmitted from RF elements 140 and 145 at positions 'b' and 'd,' respectively. As such, dotted lines 175-185 indicate positions of advancement for the resultant output beams. When the output signal beams are in phase, the output signal beams should have the same progression at each of the positions 175-185. Assuming both RF elements 140 and 145 transmit the same output signal at the same time, without any phase adjustments, the output signal beams 165 and 170 would have the same phase at the time they leave the spherical lenses 105 and 110, respectively. As shown, due to the directions the beams are transmitted with respect to how the spherical lenses 105 and 110 are aligned (i.e., the orientation of the virtual axis 115), the position 175 is equivalent to the edge of the spherical lens 105 for the signal beam 165, but is equivalent to the center of the spherical lens 110 for the signal beam 170. Similarly, the position 180 is away from the edge of the spherical lens 105 for a distance 'e' while the position 180 is equivalent to the edge of the spherical lens 110. As such, in order to make the signal beams 165 and 170 in phase, the control mechanism 160 configures the phase shifters 150 and 155 to modify (or adjust) the phase of the output signal transmitted by either RF element 140 or 145, or both output signals transmitted by RF elements 140 and 145. In this example, the control mechanism 160 can adjust the phase of the output signal transmitted by RF element 145 by a value equivalent to the distance 'e' such that output signal beams 165 and 170 are in-phase.

In some embodiments, the control mechanism 160 is configured to automatically determine the phase modifications necessary to bring the output beams in-phase based on the positions of the RF elements. It is contemplated that a user can provide an input of a geographical areas to be covered by the antenna system 100 and the control mechanism 160 would automatically move the positions of the RF elements to cover the geographical areas and configure the phase shifters to ensure that the output beams from the RF elements are in phase based on the new positions of the RF elements.

Figure 1B:
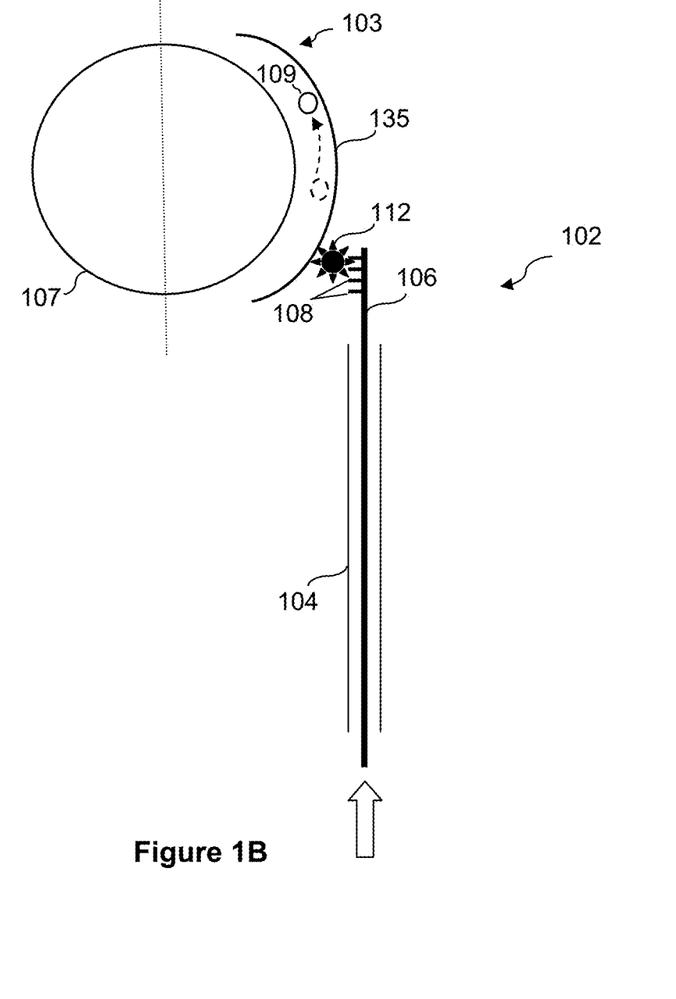
FIG. 1B illustrates an exemplary control mechanism.

FIG. 1B illustrates an example of a mechanical control mechanism 102 attached to the element assembly 103 that is associated with the spherical lens 107. The control mechanism 102 includes a housing 104, within which a rod 106 is disposed. The rod 106 has teeth 108 configured to rotate a gear 112. The gear can in turn control the movement of the RF element 109. Under this setup, a person can manually adjust the position of the RF element 109 by moving the rod 106 up and down. It has been contemplated that the rod 106 can be extended to reach other element assemblies (for example, an element assembly and spherical lens that are stacked on top of the spherical lens 107). That way, the rod can effectively control the movement of RF elements associated with more than one spherical lens.

In some embodiments, a phase shifter can be implemented within the same mechanism 102, by making at least a portion of the rod 106 using dielectric materials. When the rod includes dielectric materials, adjust the position of the rod 106 in this manner effectively modifies the phase of an output signal transmitted by the RF element 109. It is noted that one can configure the position of the rod 106 and the gear 112 such that the position of the RF element 109 and the phase modification is in-sync. This way, one can simply provide a single input (moving the rod up or down by a distance) to adjust both the position of the RF element 109 and the phase of the output signal.

It is also contemplated that an electric device (not shown) can be connected to the end of the rod (not attached to the gear 112). The electric device can control the movement of the rod 106 based on an input electronic signal, thereby controlling the movement of the RF element 109 and the phase adjustment of the output signal. A computing device (not shown) can communicatively couple with the electric device to remotely control the RF element 109 and the phase of the output signal.

Figure 2A:
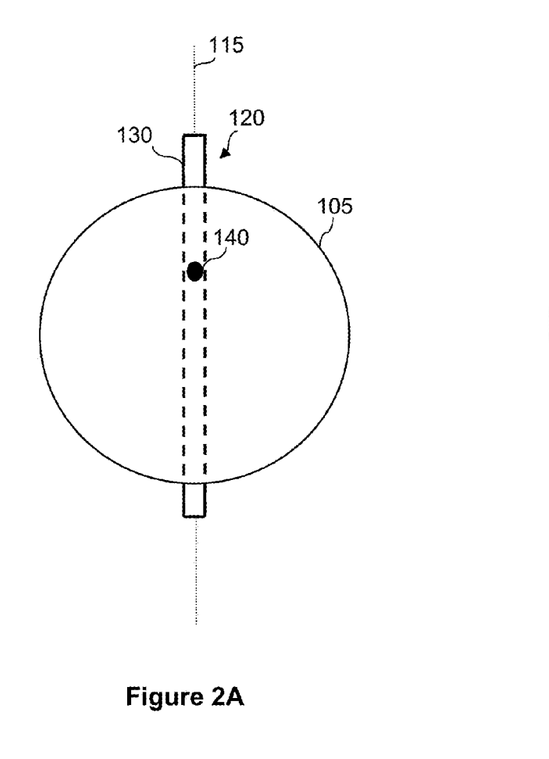
FIGS. 2A and 2B illustrate the front and back perspectives, respectively, of a spherical lens.
Figure 2B:
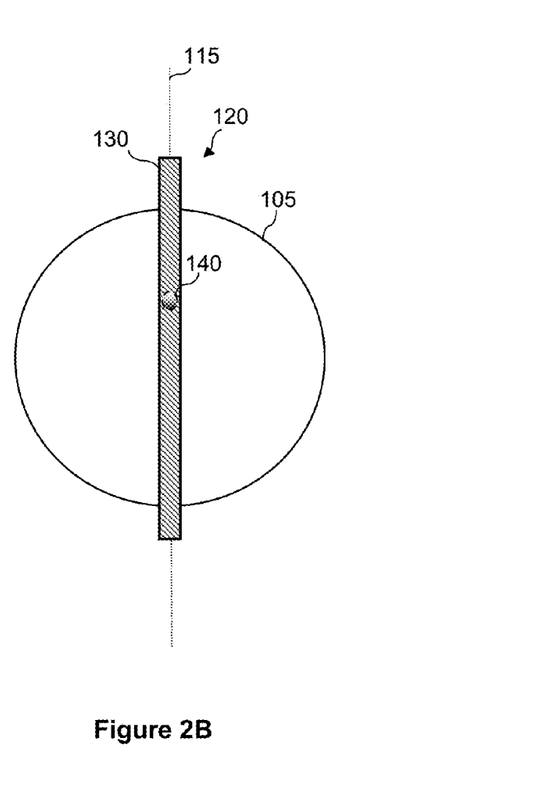

FIGS. 2A and 2B illustrate the spherical lens 105 and the element assembly 120 from different perspectives. Specifically, FIG. 2A illustrates the spherical lens 105 from a front perspective, in which the element assembly 120 (including the track 130 and the RF element 140) appear to be behind the spherical lens 105. In this figure, the signals emitting from the RF element 140 are directed outward from the page. FIG. 2B illustrates the spherical lens 105 from a back perspective, in which the element assembly 120 (including the track 130 and the RF element 140) appear to be behind the spherical lens 105. In this figure, the signals emitting from the RF element 140 are directed into the page.

Figure 3:
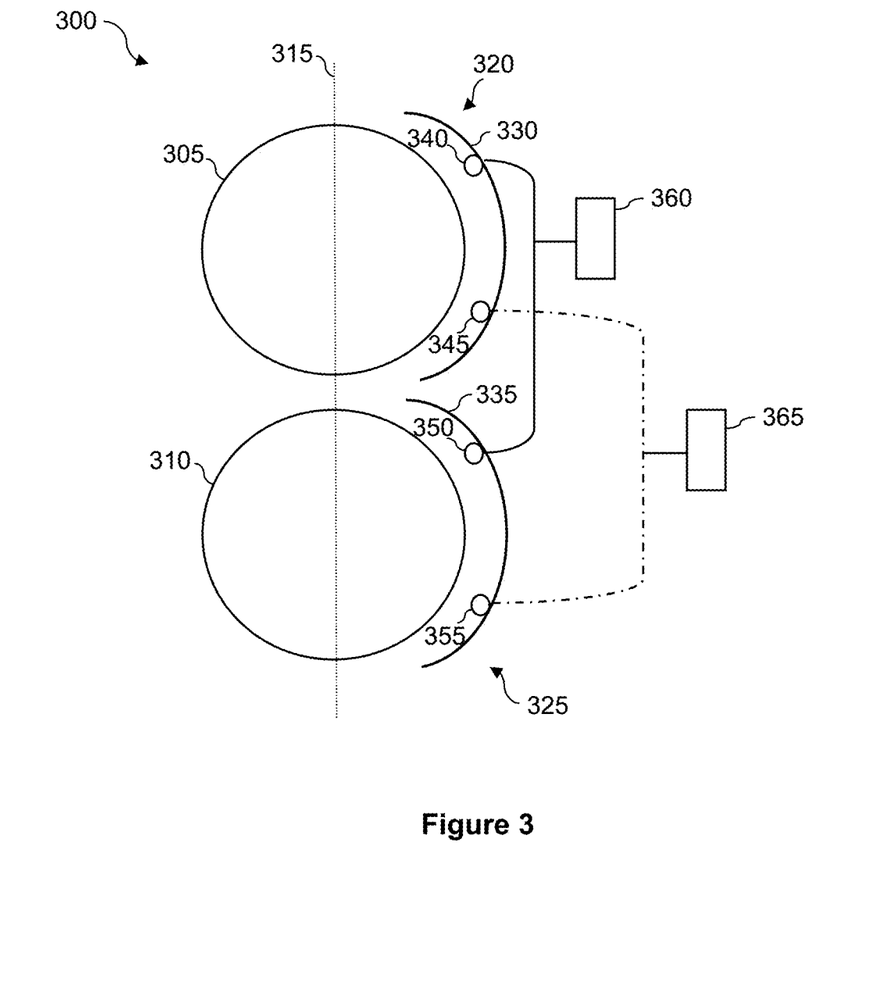
FIG. 3 illustrates an alternative antenna system having two-dimensional tracks.

FIG. 3 illustrates an antenna 300 of some embodiments in which the tracks associated with the spherical lens is two dimensional and each track associated with a spherical lens includes two RF elements. The antenna 300 is similar to the antenna 100 of FIG. 1. As shown, the antenna 300 has two spherical lenses 305 and 310 aligned along a virtual axis 315 in a three-dimensional space. The spherical lens 305 has an associated element assembly 320, and the spherical lens 310 has an associated element assembly 325. The element assembly 320 has a track 330, and similarly, the element assembly 325 has a track 335. The tracks 330 and 335 are two dimensional.

In addition, each of the tracks 325 and 335 includes two RF elements. As shown, the track 325 has RF elements 340 and 345, and the track 335 has RF elements 350 and 355. The two dimensional tracks 330 and 335 allows the RF elements 340—355 to move in a two dimensional field in their respective tracks. In some embodiments, the antenna 300 creates groups of RF elements, where each group consists of one RF element from each element assembly. In this example, the antenna 300 has two groups of RF elements. The first group of RF elements includes the RF element 340 of the element assembly 320 and the RF element 350 of the element assembly 325. The second group of RF elements includes the RF element 345 of the element assembly 320 and the RF element 355 of the element assembly 325. The antenna 300 provides a control mechanism and phase shifter for each group of RF elements. In this example, the antenna 300 provides a control mechanism and phase shifter 360 (all in one assembly) for the first group of RF elements and a control mechanism and phase shifter 365 for the second group of RF elements. The control mechanism and phase shifters are configured to modify the positions of the RF elements within the group and to modify the phase of the output signals transmitted by the RF elements in the group such that the output signals coming out for the respective spherical lens 305 and 310 are in-phase.

Figure 4A:
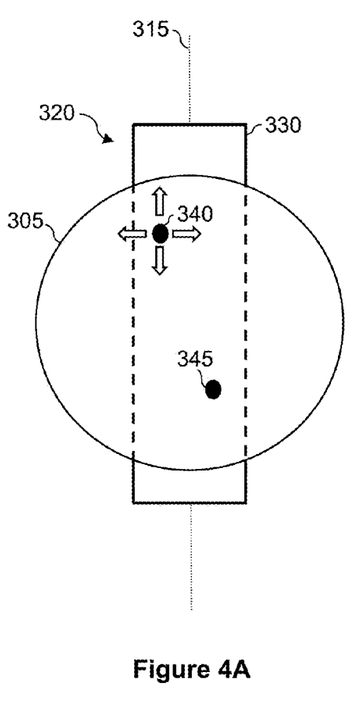
FIGS. 4A and 4B illustrate the front and back perspectives, respectively, of a spherical lens having a two-dimensional track.

FIGS. 4A and 4B illustrates the spherical lens 305 Figures and its element assembly 320 from different perspectives. Specifically, FIG. 4A illustrates the spherical lens 305 from a front perspective, in which the element assembly 320 (including the track 330 and the RF elements 340 and 345) appear to be behind the spherical lens 305. In this figure, the signals emitting from the RF element 340 and 345 are directed outward from the page. As shown, the RF elements 340 and 345 can move up and down (parallel to the virtual axis 315) or sideways (perpendicular to the virtual axis 315), as shown by the arrows near the RF element 340.

Figure 4B:
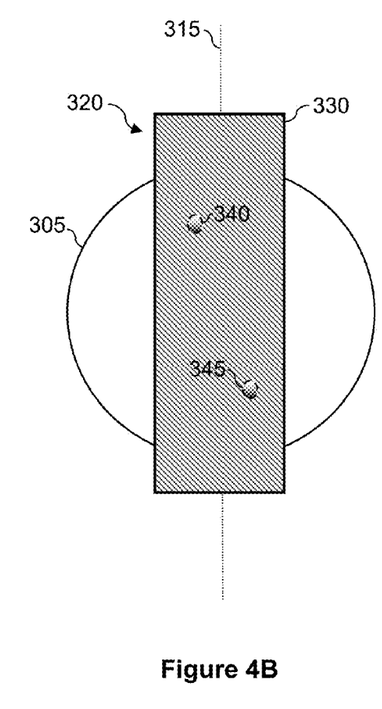

FIG. 4B illustrates the spherical lens 305 from a back perspective, in which the element assembly 320 (including the track 330 and the RF elements 340 and 345) appear to be behind the spherical lens 305. In this figure, the signals emitting from the RF elements 340 and 345 are directed into the page. It is contemplated that more than two RF elements can be installed in the same element assembly, and different patterns (e.g., 3×3, 4×3, 4×4, etc.) of RF element arrangements can be formed on the element assembly.

Figure 7:
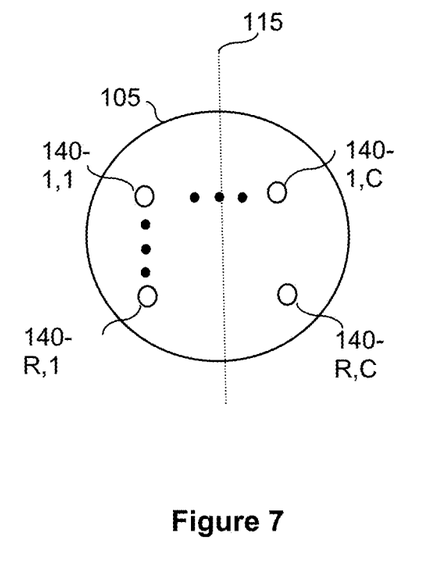
FIG. 7 illustrates another antenna with a variable size matrix of RF elements that are distributed around the spherical lens.

This embodiment is shown in FIG. 7, which illustrates this antenna with a variable size matrix of RF elements that are distributed around the spherical lens 105. In this illustration, a plurality of RF elements 140 are arranged in a plurality of rows, R, and columns C to create said RF element matrix of 3×3, 4×3, 4×4, etc. for spherical lens 105 having virtual axis 115. For example in a 4×3 matrix pattern, R would be four rows and C would be three columns, shown in the present figure from the back side of the lens for clarity of the matrix pattern. RF elements 140 would range from 140-1,1, 140-1,2 and 140-1,3 for the top row, and 140-2,1, 140-2,2 and 140-2,3 for the second row, and 140-3,1, 140-3,2, to 140-3,3 for the third row, and finally 140-4,1, 140-4,2, and 140-4,3 for the fourth row, for a grand total of 4×3=12 RF elements. The black dots in the figure represent the variable number of RF elements that could fill in the matrix pattern. Tracks are not shown for purposes of clearly showing the matrix pattern of RF elements across spherical lens 105.

Referring back to FIG. 3, it is noted that the RF elements that are in substantially identical positions with respect to their respective spherical lens are grouped together. For example, the RF element 340 is paired with the RF element 350 because their positions relative to their respective associated spherical lenses 305 and 310 are substantially similar. Similarly, the RF element 345 is paired with the RF element 355 because their positions relative to their respective associated spherical lenses 305 and 310 are substantially similar. It is contemplated that the manner in which RF elements are paired can affect the vertical footprint of the resultant beam (also known as polarized coincident radiation pattern) generated by the RF elements. As defined herein, the vertical footprint of an RF element means the coverage area of the RF element on a dimension that is parallel to the axis along which the spherical lenses are aligned. For practical purposes, the goal is to maximize the overlapping areas (also known as the cross polarized coincident radiation patterns) of the different resultant beams generated by multiple RF elements.

As such, in another aspect of the inventive subject matter, an antenna having an array of spherical lenses pairs opposite RF elements that are associated with different spherical lenses to cover substantially overlapping geographical areas. In some embodiments, each spherical lens in the array of spherical lenses has a virtual axis that is parallel with other virtual axes associated with the other spherical lenses in the array. One of the paired RF elements is placed on one side of the virtual axis associated with a first spherical lens and the other one of the paired RF elements is placed on the opposite side of the virtual axis associated with a second spherical lens. In some embodiments, the antenna also includes a control mechanism programmed to configure the paired RF elements to provide output signals to and/or receive input signals from substantially overlapping geographical areas.

Figure 5:
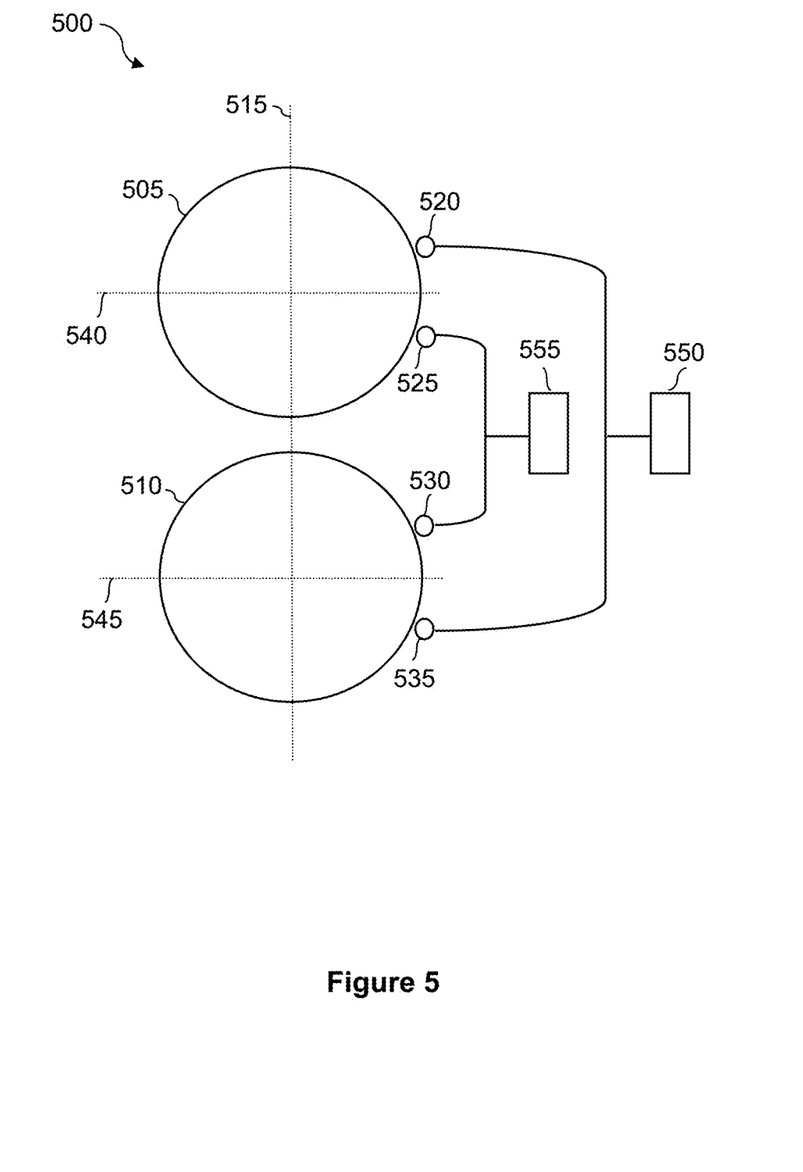
FIG. 5 illustrates an antenna that pairs opposite RF elements in the same group.

FIG. 5 illustrates an example of such an antenna 500 of some embodiments. The antenna 500 includes an array of spherical lens (including spherical lenses 505 and 510) that is aligned along an axis 515. Although the antenna 500 in this example is shown to include only two spherical lenses in the array of spherical lenses, it has been contemplated that the antenna 500 can include more spherical lenses that are aligned along the axis 515 as desired.

Each spherical lens also includes an RF element arrangement axis that is parallel to one another. In this example, the spherical lens 505 has an RF element arrangement axis 540 and the spherical lens 510 has an RF element arrangement axis 545. Preferably, the RF element arrangement axes 540 and 545 are perpendicular to the virtual axis 515 along which the spherical lenses 505 and 510 are aligned, as shown in this example. However, it has been contemplated that the RF element arrangement axes can be in any orientation, as long as they are parallel with each other.

As shown, each spherical lens in the array has associated RF elements. In this example, the spherical lens 505 has two associated RF elements 520 and 525, and the spherical lens 510 has two associated RF elements 530 and 535. The RF elements associated with each spherical lens are placed along the surface of the spherical lens, on different sides of the RF element arrangement axis. As shown, the RF element 520 is placed on top of (on one side of) the RF element arrangement axis 540 and the RF element 525 is placed on the bottom of (on the other side of) the RF element arrangement axis 540. Similarly, the RF element 530 is placed on top of (on one side of) the RF element arrangement axis 545 and the RF element 525 is placed on the bottom of (on the other side of) the RF element arrangement axis 545.

The antenna 500 also includes control mechanisms 550 and 555 for coordinating groups of RF elements. As mentioned before, it has been contemplated that pairing opposite RF elements that are associated with different spherical lens (i.e., pairing RF elements that are on opposite sides of the RF element arrangement axis) provides the optimal overlapping vertical footprints. Thus, the control mechanism 550 is communicatively coupled with the RF element 520 (which is placed on top of the RF element arrangement axis 540) and the RF element 535 (which is placed on the bottom of the RF element arrangement axis 545) to coordinate the RF elements 520 and 535 to provide signal coverage of substantially the same geographical area. Similarly, the control mechanism 555 is communicatively coupled with the RF element 525 (which is placed on the bottom of the RF element arrangement axis 540) and the RF element 530 (which is placed on top of the RF element arrangement axis 545) to coordinate the RF elements 525 and 530 to provide signal coverage of substantially the same geographical area. In some embodiments, the control mechanisms 550 and 555 also include phase shifters configured to modify the phase of the signals being outputted by their associated RF elements.

In addition to the requirement that the grouped RF elements have to be on different sides of the RF element arrangement axis, it is preferable that the distance between the RF elements and the RF element arrangement axis are substantially the same (less than 10%, and more preferably less than 5% deviation). Thus, in this example, the distance between the RF element 520 and the axis 540 is substantially the same as the distance between the RF element 535 and the axis 545. Similarly, the distance between the RF element 525 and the axis 540 is substantially the same as the distance between the RF element 530 and the axis 545.

While the RF elements 520-535 are shown to be placed at fixed locations in this figure, in some other embodiments, the antenna 500 can also includes tracks that enable the RF elements to move to different positions along the surface of their respective spherical lenses. In these embodiments, the control mechanisms 550 and 555 are configured to coordinate their associated RF elements and phase shifters to send out synchronized signals to a covered geographical area.

Figure 6:
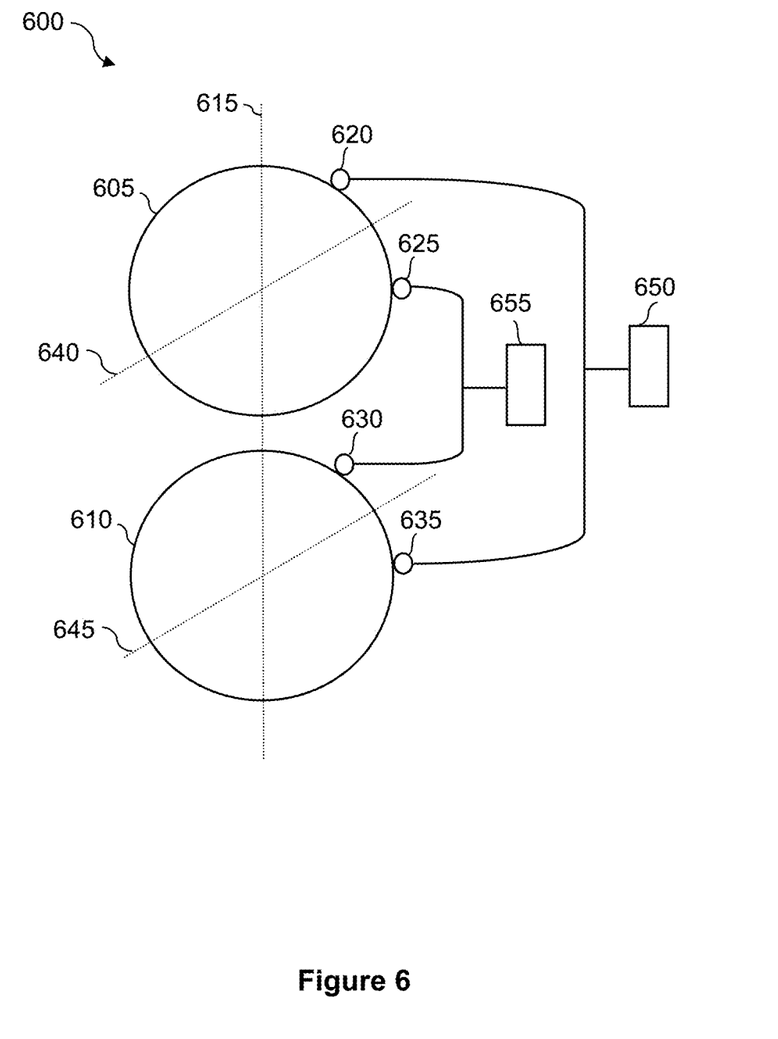
FIG. 6 illustrates another antenna that pairs opposite RF elements in the same group.

In the example illustrated in FIG. 5, the RF element arrangement axes are arranged to be perpendicular to the axis along which the spherical lenses are aligned. As mentioned above, the RF element arrangement axes can be oriented in different ways. FIG. 6 illustrates an antenna 600 having RF elements placed on different sides of RF element arrangement axes that are not perpendicular to the virtual axis along which the spherical lenses are aligned. The antenna 600 is almost identical to the antenna 500. The antenna 600 has an array of spherical lens (including spherical lenses 605 and 610) that is aligned along an axis 615. Although the antenna 600 in this example is shown to include only two spherical lenses in the array of spherical lenses, it has been contemplated that the antenna 600 can include more spherical lenses that are aligned along the axis 615 as desired.

Each spherical lens also includes an RF element arrangement axis that is parallel to one another. In this example, the spherical lens 605 has an RF element arrangement axis 640 and the spherical lens 610 has an RF element arrangement axis 645. As shown, the RF element arrangement axes 640 and 645 are not perpendicular to the virtual axis 615. By having the RF element arrangement axes in different orientations, the antenna 600 can be adjusted to cover different geographical areas (closer to the antenna, farther away from the antenna, etc.).

As shown, each spherical lens in the array has associated RF elements. In this example, the spherical lens 605 has two associated RF elements 620 and 625, and the spherical lens 610 has two associated RF elements 630 and 635. The RF elements associated with each spherical lens are placed along the surface of the spherical lens, on different sides of the RF element arrangement axis. As shown, the RF element 620 is placed on top of (on one side of) the RF element arrangement axis 640 and the RF element 625 is placed on the bottom of (on the other side of) the RF element arrangement axis 640. Similarly, the RF element 630 is placed on top of (on one side of) the RF element arrangement axis 645 and the RF element 625 is placed on the bottom of (on the other side of) the RF element arrangement axis 645.

The antenna 600 also includes control mechanisms 650 and 655 for coordinating groups of RF elements. The control mechanisms 650 and 655 are configured to pair opposite RF elements that are associated with different spherical lens (i.e., pairing RF elements that are on opposite sides of the RF element arrangement axis). Thus, the control mechanism 650 is communicatively coupled with the RF element 620 (which is placed on top of the RF element arrangement axis 640) and the RF element 635 (which is placed on the bottom of the RF element arrangement axis 645) to coordinate the RF elements 620 and 635 to provide signal coverage of substantially the same geographical area. Similarly, the control mechanism 655 is communicatively coupled with the RF element 625 (which is placed on the bottom of the RF element arrangement axis 640) and the RF element 630 (which is placed on top of the RF element arrangement axis 645) to coordinate the RF elements 625 and 630 to provide signal coverage of substantially the same geographical area. In some embodiments, the control mechanisms 650 and 655 also include phase shifters configured to modify the phase of the signals being outputted by their associated RF elements.

State of art antennas currently used for wireless broadband networks provide two cross polarized coincident radiation patterns commonly referred to as ports of the antenna. There is a growing demand from the wireless operator community for four coincident radiation patterns with good de-correlation of radio signals present on each port. Current approach for four coincident radiation patterns is to deploy redundant cross polarized antenna solutions. The method described above for pairing opposite RF elements provides a novel approach in achieving four predominantly coincident radiation patterns (two for each RF element).

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A phased array antenna, comprising:
    a plurality of radiating elements;
    a plurality of radio frequency lenses (RF lenses) aligned along a first virtual axis,
        wherein each of the plurality of radiating elements is associated with a respective one of the RF lenses, and
        wherein each of the plurality of radiating elements is angled with respect to the first virtual axis;
    a phase shifter coupled to the plurality of radiating elements; and
    a control mechanism comprising an electronic device to:
        (a) receive a geographical area to be covered by the phased array antenna, and
        (b) transmit an electronic signal to the phase shifter to shift at least one of a first phase of a first output signal of a first radiating element of the plurality of radiating elements and a second phase of a second output signal of a second radiating element of the plurality of radiating elements as a function of relative positions of the plurality of radiating elements, respectively, such that the first output signal and the second output signal are in-phase for a first geographical area.

2. The phased array antenna of claim 1, wherein the plurality of radiating elements are coupled to a track that moves the plurality of radiating elements in a direction along a plane that is parallel to the first virtual axis.

3. The phased array antenna of claim 1, wherein each of the plurality of radiating elements is disposed in a location higher than a center of its associated RF lens.

4. The phased array antenna of claim 1, wherein each radiating element is positioned so that a center of a radiation pattern emitted by the radiating element is directed substantially towards a center point of the associated RF lens.

5. The phased array antenna of claim 1, wherein each of the plurality of radiating elements directs a radiation pattern in a same angled direction.

6. The phased array antenna of claim 1, wherein each RF lens comprises a substantially spherical lens.

7. The phased array antenna of claim 1, wherein at least 50% of a surface area for each RF lens conforms to a shape of a sphere.

8. The phased array antenna of claim 1, wherein each of the plurality of radiating elements is positioned at a same distance from its associated RF lens.

9. The phased array antenna of claim 1, wherein each of the plurality of radiating elements is mounted to a flat plane of material for vertical alignment and for being angled with respect to the first virtual axis.

10. The phased array antenna of claim 1, wherein the angle of the radiating elements is not perpendicular to the first virtual axis.

11. The phased array antenna of claim 1, wherein at least one of the RF lenses comprises a dielectric material.

12. The phased array antenna of claim 1, further comprising an additional grouping of a plurality of radiating elements and a plurality of RF lenses.

13. The phased array antenna of claim 1, further comprising a second plurality of radiating elements aligned along a vertical axis, wherein each second radiating element is also associated with a respective one of the RF lenses.

14. The phased array antenna of claim 1, wherein at least a second two of the plurality of radiating elements provides beam coverage of a second geographical area different from the first geographical area.

15. The phased array antenna of claim 1, wherein at least a first two of the plurality of radiating elements provide coverage at different geographical areas and different capacity by having more radiating elements.

16. The phased array antenna of claim 1, wherein each of the plurality of RF lenses scales the capacity for the coverage area by the quantity of radiating elements associated with the RF lens compared to an RF lens with a single element.

17. A multi-beam antenna, comprising:
a plurality of radiating elements; and
a radio frequency lens (RF lens) that is positioned in front of the radiating elements, wherein the radiating elements are positioned at least part of the way around a side of the RF lens, and wherein the radiating elements are arranged in a plurality of rows and columns, where each row extends in a respective arc in a respective one of a plurality of horizontal planes and each column extends in a respective arc in a respective one of a plurality of vertical planes,
wherein the RF lens comprises a spherical RF lens, and wherein the radiating elements are orbitally arranged part of a way around the side of the spherical RF lens,
wherein the plurality of horizontal planes comprise a plurality of substantially parallel planes, and wherein the plurality of vertical planes comprise a plurality of substantially parallel planes, and
wherein each radiating element is mounted on a respective flat plane of material, and wherein each flat plane is orbitally arranged with respect to the spherical RF lens.

18. The multi-beam antenna of claim 17, wherein the plurality of horizontal planes intersect the plurality of vertical planes.

* * * * *